Patented Nov. 15, 1932

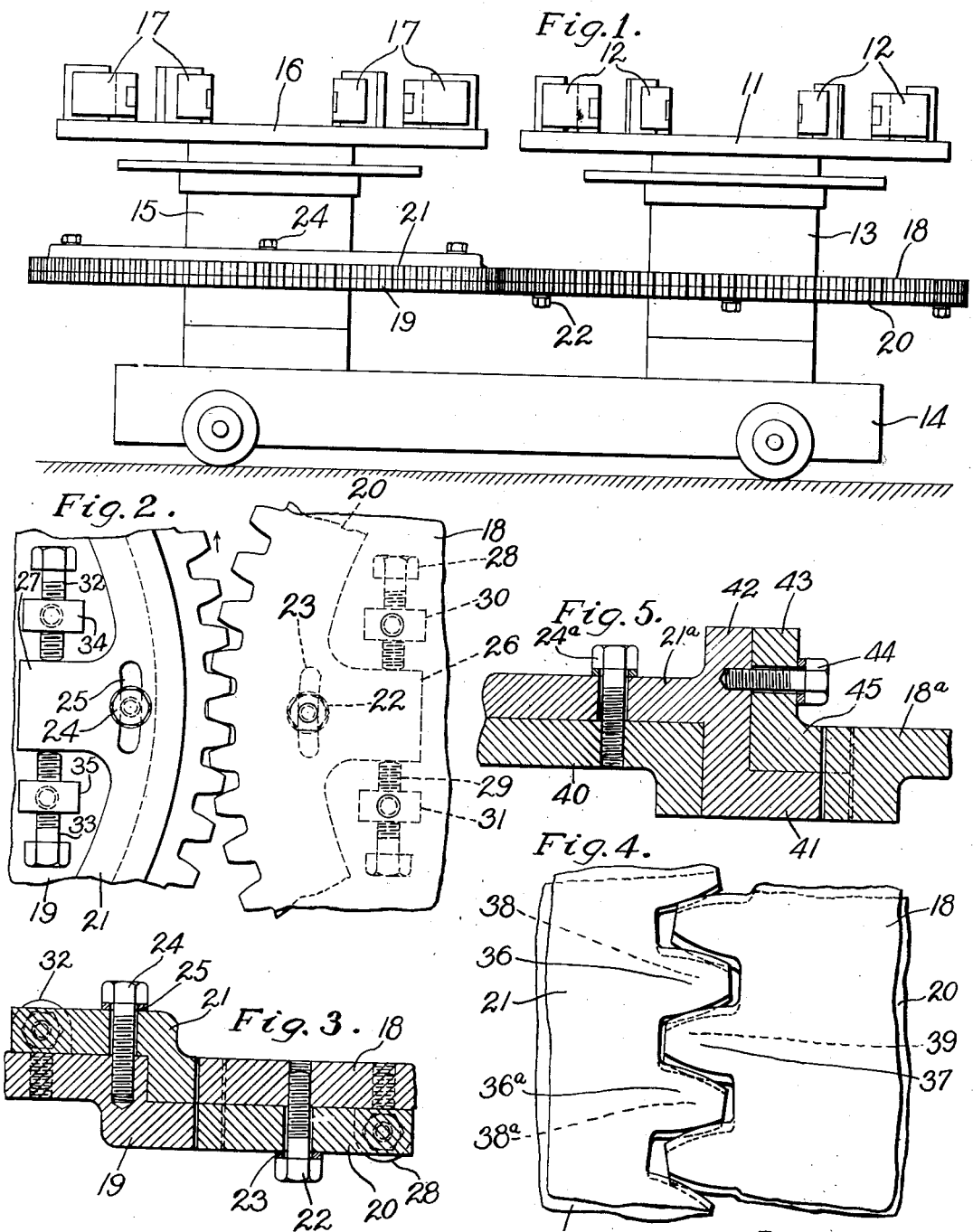

1,888,199

UNITED STATES PATENT OFFICE

EDWARD H. LORENZ, OF WEST HARTFORD, CONNECTICUT, ASSIGNOR TO HARTFORD-EMPIRE COMPANY, OF HARTFORD, CONNECTICUT, A CORPORATION OF DELAWARE

APPARATUS FOR ALIGNING MOLDS OF GLASSWARE FORMING MACHINES

Application filed May 16, 1929. Serial No. 363,522.

My invention relates generally to the art of making glassware and more particularly to methods and apparatus for aligning co-operating glassware molds located upon two adjacent synchronized rotating mold tables.

An object of the invention is to provide driving connections between two such tables so designed that exact alignment of the molds upon one table with the associated molds upon the other table may be obtained and maintained in spite of wear.

A more specific object is to provide intermeshing gears, mounted upon two adjacent mold tables in combination with means for varying the position of one or both of such gears in such a way that molds upon the tables may be brought into exact alignment.

A further object is to provide apparatus capable of maintaining exact alignment between the molds of tables provided with intermeshing gears regardless of wear on the gears.

A further object is to provide methods and apparatus capable in such construction of compensating for wear upon intermeshing gears and of maintaining the alignment of the molds at the same time.

Other objects and advantages of the invention will be apparent from the following description of apparatus embodying the invention and of methods of operating the same, when such description is considered in conjunction with the accompanying drawing, in which:

Figure 1 is an elevation of an apparatus illustrating my invention;

Figure 2 is a plan view of a fragment of the intermeshing gears on a larger scale than Fig. 1;

Fig. 3 is a view in sectional elevation of the fragment shown in Fig. 2;

Fig. 4 is a plan view of the intermeshing gears on a larger scale than Fig. 2, showing the appearance of the gears after there has been wear upon the teeth thereof and the gears have been moved to compensate for the said wear; and Fig. 5 is a sectional elevation similar to Fig. 3 showing a modified form of apparatus embodying my invention.

In the apparatus illustrated in Figs. 1–4 inclusive, there are two mold tables, one carrying blank molds and the other finishing molds, each table being mounted upon a turret. Secured to each of these turrets is a circular gear, the gears intermeshing with each other. Each of these gears is split so as to form an upper half and a lower half. The upper half of the gear on the blank mold table and the lower half of the gear on the blow mold table are shown as immovably fixed to the turrets, but the lower half of the gear on the blank mold table and the upper half of the gear on the finishing mold table are ring gears held to the fixed portions by bolts passing through slots. By this construction, it is possible to move the said rings relative to the fixed part of the gears and to move one table relatively to the other to align the molds on the two tables. Furthermore, it is possible to compensate for wear on the teeth of the gears while maintaining the molds in alignment.

Referring particularly to the drawing, I have shown in Fig. 1 a parison mold table 11 carrying a plurality of parison molds 12, the table being mounted upon a rotatable turret 13 which is in turn mounted upon a movable carriage 14. The movable carriage 14 also carries a second rotatable turret 15 which supports the finishing mold table 16. The finishing mold table carries a plurality of finishing molds 17. The blank molds may receive glass in any known way—as the suspended charge method or the suction gathering method—their exact form and operating mechanisms being such as is well known and adapted to the particular method. The mold tables may be adapted to be rotated either continuously or intermittently.

Intermeshing gears are provided for the purpose of causing the tables to rotate in synchronism and for obtaining and maintaining exact alignment of each mold with its associate finishing mold to assure proper transfer, in one of several well known ways, of blanks to the finishing mold. The turret 13 has secured thereto a fixed gear 18 and the turret 15 has secured thereto a fixed gear 19. These gears are not in direct mesh or alignment with each other. Secured beneath the fixed gear 18 is a movable ring gear 20 in alignment with the gear 19 and having its teeth intermeshing with the teeth of the gear 19. Fixed above the gear 19 is a similar movable ring gear 21 in alignment with the gear 18 and having its teeth intermeshing with the gear 18. The ring gear 20 is secured to the gear 18 by bolts 22 which pass through slots 23 in the ring 20 and the ring gear 21 is secured to the gear 19 by bolts 24 which pass through slots 25 in the ring gear 21.

The ring gears 20 and 21 are adapted to be moved relative to the gears 18 and 19 about the common centers. To this end the slots 23 are arranged concentric with the periphery of the ring gear 20, the gear 18 and the rotating turret 13, and the slots 25 are arranged concentric with the periphery of the ring gear 21, the gear 19 and the rotating turret 15. Lugs 26 and 27 are formed on the ring gears 20 and 21 respectively and screws 28 and 29 passing through lugs 30 and 31 respectively on the fixed gear 18 and screws 32 and 33 passing through lugs 34 and 35 respectively on the fixed gear 19, are designed to bear against the lugs 26 and 27 to position the ring gears 20 and 21 relative to the gears 18 and 19. As shown more clearly in Figs. 3 and 4, the teeth 36, 36a, etc., of the ring 21 are adapted to mesh with the teeth 37 of the gear 18 and the teeth 38, 38a, etc., of the gear 19 are adapted to mesh with the teeth 39 of the ring gear 20.

In the operation of this embodiment of my invention, the ring gears 20 and 21 may be assembled so that the teeth thereof are in alignment with the teeth of the fixed gears 18 and 19. In order to secure the desired alignment of the molds, the bolts 22 and 24 and the screws 28, 29, 32 and 33 may be loosened, allowing movement of the rings relative to the fixed gears. One of the tables may then be rotated while the other is held stationary until the molds come into exact alignment. By tightening the screws and the clamp bolts, the respective gears will be held in this new relation, possibly with the teeth of the ring gear 21 staggered, relative to the teeth of the gear 19 and with the teeth of the ring gear 20 staggered, relative to the teeth of the gear 18. If desired, the clamp bolts 24 only may be loosened at first and the movements of one table relative to the other may be accomplished by alternately loosening some of the screws and tightening others, as for example, loosening the screws 29 and 32 slightly and tightening the screws 28 and 33. This alternate loosening and tightening of the screws will cause a relative movement of the ring gear 20 in one direction and of the ring gear 21 in the same rotative direction and thus accomplish a relative movement of the fixed gears 18 and 19 and of the tables 11 and 16.

After the glass making machine has been in use for some time, the wear upon the teeth of the gears may cause a looseness or "play" in the intermeshing of the gears. In order to compensate for this wear, to prevent looseness and back lash in the operation of the machine and to eliminate a tendency towards improper alignment of the molds, I contemplate varying the relative position of the ring gears relative to the fixed gears. If the wear is only on one side of each tooth, it may be compensated for by loosening one set of screws and tightening the opposite screws, as for example, loosening screws 32 and tightening screws 33. Throughout the consequent movement of the ring gear 21 the fixed gears 18 and 19 and the ring gear 20 will be held still and the alignment of the molds will not be disturbed. If the wear is on both sides of the teeth, this wear may be compensated for by means of the screws 28, 29, 32 and 33 by loosening the screws pointing in one direction while tightening the other screws. For example, screws 28 and 32 might be loosened and 29 and 33 might be tightened. Such action will move both of the movable ring gears in opposite rotative direction and will consequently take up and compensate for the wear upon the teeth without altering the position of the mold tables, thus not disturbing the alignment of the molds. However, if the alignment of the molds is disturbed by the use of the screws in compensating for wear, the alignment may be regained by an operation similar to that in which the alignment was obtained in the first instance.

After the teeth have been worn and the ring gears 20 or 21 or both have been moved relative to the tables to compensate for said wear, all of said teeth will not contact. For instance as shown in Fig. 4, tooth 37 may contact with tooth 36 but not with tooth 36a and tooth 39 may contact with tooth 38a, but not with tooth 38. However, because of the contacts between teeth 37 and 36 and between teeth 39 and 38a, there is no looseness or play between the teeth.

In Fig. 5, I have shown a modified form of apparatus embodying my invention in which a fixed gear 18a is secured to the rotatable turret 13, this gear wheel being double the thickness of the gear wheel 18. Fixed to the turret 15 is a circular gear support 40 and mounted upon this support is a ring gear 21a. This ring gear 21a is fastened to the support 40 by clamp screws 24a in a manner similar to that in which the ring gear 21 is fastened to the gear 19 and may be moved relative to the support by screws similar to the screws 32 and 33. The ring gear 21a has a lower flange 41 carrying teeth arranged to mesh with the lower half of the gear 18a and has an upper flange 42 for purposes to be described. Arranged outside of the ring gear 21a is a second ring gear 43 fastened to the flange 42 by bolts 44 similar to the clamp bolts 24 and arranged to be moved relative to the flange by screws similar to the screws 32 and 33. This ring gear 43 carries a flange 45 with gear teeth arranged to mesh with the upper half of the gear 18a.

In the operation of this embodiment of my invention, the ring gears 42 and 43 are assembled with the teeth thereof in alignment with each other and intermeshed with the teeth of the gear 18a. In order to bring the molds into the exact alignment, the bolts 24a may be loosened and the ring gears 21a and 43 may be moved as a unit relative to the support 40 and thus relative movement of the tables 11 and 16 may be obtained to align the molds. When after use, the gears become loose due to wear, the ring gear 43 may be moved relative to the ring gear 42 in a manner similar to the relative movements previously described in order to stagger the teeth of the ring gears 21a and 43, and thus to compensate for the wear upon the teeth. This movement of the rings relative to each other will probably disturb the alignment of the molds upon the tables 11 and 16 and a movement of the ring 21a relative to the support 40 may be employed to bring the said molds back into alignment.

It is to be understood that the above described embodiments of the invention are for the purpose of illustration only and various changes may be made therein without departing from the sipirit and scope of the invention.

I claim:

1. Apparatus for forming glassware, comprising a plurality of mold carriers, molds carried by each of the said carriers, means for aligning the molds upon one carrier with the molds upon another carrier, synchronized driving connections between the said carriers, and means for taking up wear in the said driving connections without disturbing the alignment of the molds.

2. Apparatus for forming glassware, comprising a plurality of mold carriers adapted to rotate about different axes, molds carried by each of said carriers, a driving connection between the carriers comprising a gear mounted on each carrier, said gears comprising portions fixed to the carrier and at least two portions capable of angular adjustment whereby wear on the teeth of the gears may be compensated and alignment of the molds on one carrier with the molds on the other carrier may be assured without necessarily moving the molds relative to their carriers.

3. Apparatus for forming glassware, comprising a plurality of mold carriers adapted to rotate about different axes, molds carried by each of said carriers, a driving connection between the carriers comprising a gear on each carrier, each of said gears comprising a portion fixed to the carrier and a portion capable of angular adjustment about the axis of the carrier, and means for maintaining the adjustable portions in adjusted position whereby wear upon the teeth of the gears may be compensated without disturbing the alignment of the molds upon the carriers.

4. In apparatus for forming glassware, a plurality of mold carriers, molds mounted upon the said carriers, means for aligning the said molds, comprising a gear fixed to one of the said carriers, a second gear mounted upon another of the said carriers, but movable relative thereto and intermeshed with the first gear, and means for taking up wear upon the teeth of the said gear comprising a gear fixed upon the second named carrier, another mounted upon the first named carrier, and movable relative thereto, the said last named movable gear intermeshing with said last named fixed gear.

5. Apparatus for forming glassware, comprising a plurality of mold carriers, molds carried by each of the said carriers, and synchronized driving connections between the said carriers, said connections including means for taking up wear in the said driving connections and means for maintaining the alignment of the molds.

Signed at Hartford, Conn., this 10th day of May, 1929.

EDWARD H. LORENZ.